UNITED STATES PATENT OFFICE.

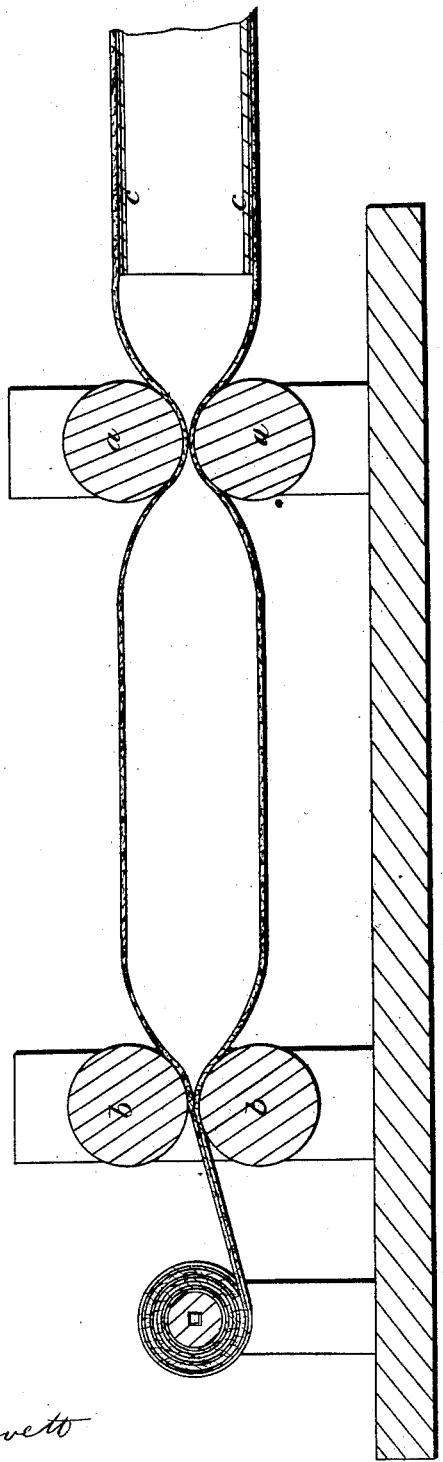

THOMAS J. MAYALL, OF ROXBURY, MASSACHUSETTS.

RUBBER HOSE-TUBING.

Specification of Letters Patent No. 28,389, dated May 22, 1860.

*To all whom it may concern:*

Be it known that I, THOMAS J. MAYALL, of Roxbury, in the county of Norfolk and State of Massachusetts, have invented certain new and useful Improvements in the Manufacture of Hose or Tubing for Conveying Liquids; and I do hereby declare that the following description, taken in connection with the accompanying drawings hereinafter referred to, forms a full and exact specification of the same, wherein I have set forth the nature and principles of my said improvements by which my invention may be distinguished from all others of a similar class, together with such parts as I claim and desire to have secured to me by Letters Patent.

I have heretofore made an improved hose or tubing which has proved much better than those commonly used and consists of a seamless tube woven of cotton, flax or other suitable material lined with a coating or sheet of india-rubber or gutta-percha. One mode that I have used for making this hose or tubing is to first cover the woven tube with a coating or encircling sheet of india-rubber or gutta-percha and then turn the hose thus formed inside out. It will be evident that where the woven tube is very thick and heavy as is necessary for strong hose, the difficulty of turning it inside out is very great.

The present invention consists in a new mode of forming a coating or lining of india-rubber or gutta-percha to the inside of a woven tube so as to obviate the necessity of turning it inside out however thick and heavy it may be. I effect the desired results by first filling or partially filling the woven tube with any suitable rubber cement and then forcing the same into the inner surface of the tube by means of rolls or other suitable machinery applied to the outside of the woven tube while the said cement is within the same, the result thus produced being the formation of an adhesive coating or lining upon the inner surface of the woven tube, which is then drawn over a mandrel upon which is previously placed a thin tube of india-rubber or gutta-percha that is to form the inside lining to the hose. In order to allow the woven tube with its sticky interior surface to be drawn over the thin tube or lining without obstruction it will be evident that it must be dusted with some non-adhesive substance. But as it is preferred that the hose when drawn over the inner tube or lining should be subjected to a vulcanizing heat in order to firmly unite the inner lining or tube with the woven tube by curing the cement between them, the coating or dust applied to the outside of the rubber tube or lining while on its mandrel, must not only be non-adhesive, but of such a nature as to incorporate with or become a part of the rubber cement when vulcanized. For this purpose I have discovered that flour, either burnt or otherwise, fine bolted meal or other similar substances may be used, they being sufficiently non-adhesive to permit the woven tube with its sticky interior to pass readily over the rubber lining, and yet, when exposed to heat, will fuse with and become a part of the cement.

In the accompanying drawings an arrangement of devices is shown by which the purposes of my invention may be practically carried out. *a a—b b* are four rolls between which the woven tube partially filled with rubber cement is fed, as shown, the rolls *a a* acting upon the outer surface of the woven tube so as to drive the rubber cement into the interior surface of the same and the rolls *b b* merely nipping it together to hold the liquid cement in place. After the woven tube is thus coated on its inside it is drawn over a mandrel *c c* having previously placed on it a thin tube of rubber or gutta percha which is dusted or sprinkled with flour, either burnt or otherwise, fine bolted meal, or other similar substances possessing the peculiarities hereinbefore stated. The woven tube thus lined may be then tightly wound with cords or cloths upon the mandrel and then vulcanized, the result being that by means of the cement, the inner lining or tube of india-rubber or gutta-percha becomes firmly united to the woven tube, thus accomplishing the desired object, viz, the lining of a seamless woven tube, however thick it may be, with a smooth coating or inner tube of india rubber or gutta-percha.

It will be obvious that by the means above described or by repeating the operation of driving the rubber cement into the interior surface of the woven tube, and then curing the said cement, that a sufficient coating may be formed thereon to render any further lining unnecessary but the inner tube of sheet rubber or gutta percha I prefer to insert, as it produces a smoother bore than would otherwise be possible.

Having thus described my improvements, I shall state my claims as follows:

What I claim as my process in the manufacture of seamless hose or tubing is—

1. Filling or partially filling a woven tube composed of cotton, flax or other fibrous materials with any proper rubber cement and then driving the said cement into the inner surface of the woven tube, so as to form a water-proof lining therein by means of rolls, or other devices for accomplishing the desired result, applied to the outside of the woven tube.

2. Inserting within the woven tube coated on its interior surface with an adhesive cement as described an inner tube of rubber or gutta-percha so that the woven tube and inner tube can be united by vulcanizing as set forth, and for the purpose of forming a smooth bore to the hose or tubing.

3. Sprinkling or dusting the outer surface of the rubber or gutta-percha tube that is to form the lining of the hose with such a non-adhesive material as shall incorporate with the adhesive cement on the inner surface of the woven tube when heated or cured as set forth.

THOS. J. MAYALL.

Witnesses:
JOSEPH GAVETT,
ALBERT W. BROWN.